United States Patent Office 3,777,010
Patented Dec. 4, 1973

3,777,010
H₂S REMOVAL
Stephen W. Nicksic, Brea, and Shigeto Suzuki, San Francisco, Calif., assignors to Chevron Research Company, San Francisco, Calif.
No Drawing. Filed June 21, 1971, Ser. No. 155,341
Int. Cl. C01b 17/04
U.S. Cl. 423—573                                6 Claims

ABSTRACT OF THE DISCLOSURE

A process for removing $H_2S$ from a gas mixture containing $H_2S$ and for the production of sulfur which process comprises contacting the gas mixture with a solution, prepared by mixing 100 parts of an $H_2S$ solvent with 0.05 to 5.0 parts of an amine, to absorb $H_2S$ from the gas mixture, and oxidizing $H_2S$ absorbed in the solution to sulfur by contacting the solution containing $H_2S$ with a gas comprising molecular oxygen.

Preferably the gas mixture from which the $H_2S$ is removed is a mixture of $H_2S$ and light hydrocarbon gases. Preferred amine additives are alkyl nitrogen compounds such as dimethylamine. Preferred $H_2S$ solvents include dimethyl formamide.

BACKGROUND OF THE INVENTION

The present invention relates to the removal of $H_2S$ from gas mixtures. More particularly, the present invention relates to the removal of $H_2S$ from gas mixtures using a dimethyl formamide solvent.

Numerous processes have been suggested for removal of $H_2S$ from gas streams. The most common commercial method of $H_2S$ removal by absorption comprises contacting a gas mixture containing $H_2S$ with an amine such as monoethanolamine or diethanolamine. Regeneration of the amine absorbents requires considerable heat input because the absorption of the $H_2S$ in the amine is mainly by chemisorption rather than by physical absorption. The necessity of considerable heat in regeneration of the amine absorbent plus corrosion problems which frequently occur in the amine system result in the amine absorption processes not being an inexpensive means to remove $H_2S$ from gas mixtures.

In addition, the process of the present invention is preferably applied to removing $H_2S$ while substantially avoiding $CO_2$ removal, whereas amine absorbents usually remove both $CO_2$ and $H_2S$, thus using substantial amounts of absorbent on $CO_2$ removal.

U.S. Pat. 3,034,865 is directed to absorbing $H_2S$ in a basic nitrogen compound solution, for example, absorbing $H_2S$ in an amine solution such as dimethylamine and then oxidizing the $H_2S$ with oxygen in the presence of a metal phthalocyanine catalyst. Thus, the process of U.S. Pat. 3,034,865 uses a compound such as an amine as a solvent.

U.S. Pat. 2,987,379 is directed to the reaction of sulfur dioxide with $H_2S$ to form sulfur. $SO_2$ and $H_2S$ are absorbed in an organic solvent containing water and reacted to form sulfur. The patent states the reaction is carried out without a catalyst. An amine is added so that the reaction of $SO_2$ with $H_2S$ will yield sulfur of a more easily recoverable granular state. U.S. Pat. 2,987,379 is not directed to the oxidation of $H_2S$ with gaseous oxygen or air.

U.S. Pat. 3,023,088 is directed to a process for removing $H_2S$ from a gas stream and converting the $H_2S$ to sulfur. According to this patent, sulfur dioxide and hydrogen sulfide are absorbed into a carboxamide as, for example, dimethyl formamide or diethyl formamide, and the sulfur dioxide and hydrogen sulfide are reacted in liquid phase in contact with the solvent to thereby form sulfur which is separated as a product from the solvent. Thus it is pointed out in U.S. Pat. 3,023,088 that the process " . . . provides for effecting the reaction between sulfur dioxide and hydrogen sulfide to form sulfur and water while these two reactants are absorbed in a common liquid medium. By providing for such solution or absorption, the molecules are apparently brought into close proximity with others so that reactions can occur more readily between them. In the process of this invention, the reaction occurs without a catalyst . . ."

Thus, it is seen that U.S. Pat. 3,023,088 is directed to reaction of $SO_2$ with $H_2S$ in liquid phase and without any catalyst added to the carboxamide solvent to enhance the absorption ability of the carboxamide or to enhance the oxidation reaction.

U.S. Pat. 2,251,216 relates to the removal of gases such as $SO_2$ or hydrogen sulfide from gas mixtures containing the same, using a dimethyl formamide solvent. However, no additives or initiators are disclosed as used in the solvent.

According to the Russian reference, Zh. Vses. Khim. Obshchest. (1969) 14 (5), 584–585, $H_2S$ was absorbed in a dimethyl formamide solvent and oxidized to sulfur from atmospheric oxygen. (The sulfur precipitation was accelerated when oxygen was passed into the solution.) In the Russian article it is indicated that since chromatographic examination of the dimethyl formamide did not reveal any impurities, the oxidation of $H_2S$ to sulfur was taking place solely from atmospheric oxygen. Thus, the Russian reference does not indicate that any catalysts or impurities are added to the dimethyl formamide solvent used to improve the absorption and removal of $H_2S$. Also, the Russian reference does not indicate that a degraded or partially decomposed dimethyl formamide solution is desirable for use in the removal of $H_2S$ from gas streams.

SUMMARY OF THE INVENTION

According to the present invention a process is provided for removing $H_2S$ from a gas mixture containing $H_2S$ and for the production of sulfur which process comprises contacting the gas mixture with a solution, prepared by mixing 100 parts of an $H_2S$ solvent with 0.05 to 5.0 parts of an amine, to absorb $H_2S$ from the gas mixture, and oxidizing $H_2S$ absorbed in the solution to sulfur by contacting the solution containing $H_2S$ with a gas comprising molecular oxygen.

$H_2S$ solvent is used herein to mean a solvent which can absorb at least 0.5 gram of $H_2S$ per 100 cubic centimeters of solvent at room temperature. Particularly preferred solvents include dimethyl formamide, monomethyl formamide, N-methylpyrrolidone, hexamethylphosphoratriamide, and sulfolane. We have found dimethyl formamide to be a particularly effective solvent and reaction medium for the process of the present invention.

Among other factors, the present invention is based on the finding that when using fresh dimethyl formamide, $H_2S$ removal efficiency (that is, percent $H_2S$ removed based on the amount of $H_2S$ in the feed gas) was less than about 90 percent, whereas when an amine was added the efficiency of $H_2S$ removal unexpectedly increased to more than about 99 percent efficiency.

In our test apparatus absorption of $H_2S$ and oxidation of $H_2S$ were carried out in the same vessel. In general, the percent $H_2S$ removal could be kept as high as about 95 to 99 percent by keeping the oxygen sparger to the absorption-oxidation vessel clean of sulfur which would tend to deposit, and by periodically adding small amounts of amine (of the order of the few tenths weight percent of the total dimethyl formamide solution).

It was found particularly important to add small amounts of amine after accumulated hydrocarbons and water in the dimethyl formamide solvent were stripped from the dimethyl formamide by fractional distillation.

In the process of the present invention it is particularly preferred to use the amine catalyst additive or initiator in the dimethyl formamide solvent at lower operating temperatures, e.g. when the absorption is carried out at a temperature between about 30° and 110° F. Relatively low operating temperatures, i.e., below 110° F. and more preferably below 100° F., for absorption of $H_2S$ into dimethyl formamide have been found by us to be especially preferred from the standpoint of minimizing the degradation of the dimethyl formamide, i.e., the oxidation of the dimethyl formamide to heavy ends.

The term "amine" is used herein to mean ammonia or compounds derived from ammonia by substituting organic radicals (with carbon attached to nitrogen) for one or more of the hydrogens of $NH_3$, thus the term amine is used herein to include $NH_3$, $H_2NR$ (primary amine), RHNR (secondary amine) and $R_2NR$ (tertiary amine). In general the organic radicals will have less than 20 total carbon atoms.

In the process of the present invention it appears that the amine additive acts as a catalyst or as an initiator. It is believed that the amine additive functions mainly by greatly improving the oxidation step of the present invention.

After an absorption-oxidation process using dimethyl formamide is on stream for about 10 or 20 hours with a fresh batch of dimethyl formamide the $H_2S$ removal efficiency is less than about 70 percent, particularly when operating at temperatures below about 140° F. If a small amount of the amine is added, the percentage $H_2S$ removal immediately jumps to about 95 to 99 percent removal or more. Because the amine is added in only small amounts, for example, a few tenths weight percent, it is not the gross absorbent. However, the amine has been found to greatly enhance the $H_2S$ removal in the absorption-oxidation process of the present invention.

Upon using the amine in the process of the present invention the amine is believed to be converted to another form. For example, when dimethylamine is added to dimethyl formamide it is not found in samples of the dimethyl formamide solution. Thus it appears that the dimethylamine is converted to a form other than its original form.

The use of the amine additive as indicated above is particularly preferred for lower temperature $H_2S$ absorption, for example, $H_2S$ absorption, at 30° to 140° F., and more preferably at 30° to 100° F. At higher temperatures, that is, above about 160° F., the dimethyl formamide appears to rather readily degrade and a catalyst or initiator species appears to be eventually generated. Thus in the absorption-oxidation process of the present invention cooxidative degradation of dimethyl formamide occurs; the cooxidation becomes severe at temperatures in excess of 140° F., and extremely severe at temperatures in excess of 160° F. Although the degraded dimethyl formamide can be regenerated, this is undesirable, and must be done more frequently than economically feasible when operating the absorber/oxidizer at high temperatures, i.e., at temperatures in excess of 140° F. In any case, however, the addition of the amine additive, for example dimethylamine, appears to increase the ability of the dimethyl formamide to remove $H_2S$ in our process, and the amine additive is particularly advantageous for use in starting up the dimethyl formamide removal process, i.e., getting on stream the dimethyl formamide removal process at high percent $H_2S$ removal efficiencies.

Various means can be employed to regenerate the dimethyl formamide absorbent solution. In the present invention the regeneration is effected by the oxidation of the absorbed $H_2S$ to sulfur followed by removal of the sulfur from the dimethyl formamide solution. The sulfur is removed, for example, by phase separation and/or crystallization and/or filtration. The major portion of the filtrate is recycled to the absorber, but a minor portion is distilled to remove water. The major portion of the dehydrated dimethyl formamide from the distillation is returned to the absorber and a minor portion is distilled. The distilled dimethyl formamide is returned to the absorber and the bottoms product, comprising mainly oxidatively degraded dimethyl formamide, is preferably reacted with formic acid to regenerate dimethyl formamide which is then added to the absorber. The oxygen can be added to the same vessel in which the $H_2S$ is absorbed, or the oxidation step can be carried out in a separate vessel. The use of a separate vessel for oxidizing $H_2S$ which has been absorbed in the dimethyl formamide solution is usually preferred as then the sweetened gas left after the $H_2S$ absorption step is not diluted with unreacted portions of the gaseous oxidizing stream as is the case when the absorption and oxidation are carried out in a common vessel.

The process of the present invention is particularly applicable to well gases at low or moderate pressure, that is, light hydrocarbon gaseous streams containing $H_2S$ impurities at pressures between about atmospheric and a few hundred p.s.i.g. The process can also be used at higher pressures as the dimethyl formamide is a good physical absorbent for $H_2S$. The process can be used to remove $H_2S$ from gas mixtures other than light hydrocarbon-$H_2S$ mixtures as, for example, gas mixtures comprising $H_2S$ and hydrogen, or $H_2$ and carbon dioxide, or $H_2S$ and nitrogen.

Because the process of the present invention can achieve 99+ percent efficiency for $H_2S$ removal in a single contacting stage, the process can be used to obtain pipeline gas or natural gas containing no more than a few (for example, about 5 p.p.m. or less) of $H_2S$. The amount of $H_2S$ in the feed to the process of the present invention can range from 10 p.p.m. $H_2S$ by volume to as high as 20 or 30 volume percent $H_2S$. More usually the process of the present invention is applied to gas mixtures containing between a few hundredths percent of $H_2S$ by volume up to a few percent $H_2S$ by volume, for example, 0.1 percent $H_2S$ by volume up to about 5 percent $H_2S$ by volume. Preferably the amount of amine additive is 0.05 to 0.9 part by weight to 100 parts dimethyl formamide.

EXAMPLES

Example 1

A cylindrical tube (14" x 2½") with a gas sparger tube inserted into its bottom was charged with fresh dimethyl formamide (700 grams). The temperature of the dimethyl formamide solution was kept at 70° F. by circulating water through an outer jacket. A feed gas (a mixture of 80 percent $CH_4$, 10 percent air, 10 percent $CO_2$, and 0.7 percent $H_2S$) was passed through the solution at the rate of 3 liters/min. and off gas was analyzed for $H_2S$ content. After 21 hours of continuous gas scrubbing, the off gas still contained 0.17 percent $H_2S$ (1700 p.p.m.). At this point, 1.5 grams dimethylamine was added to the dimethyl formamide solution, and the $H_2S$ level in the off gas went down below 10 p.p.m., an unexpected and dramatic improvement.

The run was continued for 270 hours with occasional removal of solid sulfur by filtration. At the end of this period, the water content in the dimethyl formamide was 14 weight percent and the $H_2S$ level in the off gas was still below 100 p.p.m. At this point, the water content in the dimethyl formamide was reduced from 14 to 7 percent by distilling water out, and the $H_2S$ level in the off gas went up to 0.1 percent. An addition of 1.5 grams dimethylamine to the dimethyl formamide solution again reduced the $H_2S$ level to below 10 p.p.m., and after an additional 70 hours scrubbing the level was still 15 p.p.m. Good quality sulfur crystals were produced throughout the run.

Example 2

The same reactor used in the first example was charged with 700 grams fresh dimethyl formamide, and the same feed gas was passed into the solution at 139° F. After one hour of operation, the off gas contained about 0.3 percent $H_2S$, and, at this point, 1.5 grams dimethylamine was added. The $H_2S$ level in the off gas went down to below 10 p.p.m. and remained at the low level after 10 hours of scrubbing operation.

Example 3

This example is directed to chemical recovery of the dimethyl formamide from degraded dimethyl formamide bottoms product.

We have found that bottoms product, which accumulates after using the dimethyl formamide for $H_2S$ absorption, can be regenerated by thermal treatment with acid as, for example, with aqueous formic acid. The bottoms product in the dimethyl formamide absorption solution is believed to be groups such as Groups III and IV shown below joined by —S— and —S—S— bonds.

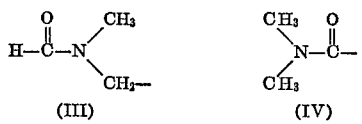

(III)    (IV)

We found that when the bottoms product was heated with aqueous formic acid dimethyl formamide (DMF) was regenerated and also monomethyl formamide (MMF) was obtained. Both the DMF and the MMF were found effective for $H_2S$ removal in the process of the present invention. MMF can be used alone or with DMF.

Example 4

A 67-hour N-methylpyrrolidone (NMP) run at 100° F. showed that a "sweetening efficiency"

sweetening efficiency
$$=100\left(\frac{\text{p.p.m. } H_2S \text{ in feed} - \text{p.p.m. } H_2S \text{ in off gas}}{\text{p.p.m. } H_2S \text{ in feed}}\right)$$

of 75 percent in one stage with a gas of 0.8 percent $H_2S$ content could be obtained in our stirred reactor when less than 0.1 percent per hour of amine, e.g., diisopropylamine, was continuously fed into the solution. Crystalline and easily filterable sulfur separated from the NMP solution.

Hexamethylphosphoratriamide (HMP) runs at 83° F. and 118° F. in our stirred reactor showed that a sweetening efficiency of 90 percent was obtainable at both temperatures if dimethylamine or aqueous ammonia was added in a catalytic amount (0.05 to 0.9 weight percent) at a few hours interval.

Sulfolane (a cyclotetramethylene sulfone, specifically tetrahydrothiophene-1,1 dioxide, as described in U.S. Pat. 3,039,251 and referred to in U.S. Pat. 3,352,631) with its low vapor pressure was a good solvent for the reaction at 70° F. if a small amount of dimethylamine or aqueous ammonia was intermittently added. Sulfur was found to froth out of the sulfolane solution as fine particles.

Although various embodiments of the invention have been described, it is to be understood that they are meant to be illustrative only and not limiting. Certain features may be changed without departing from the spirit or scope of the present invention. It is apparent that the present invention has broad application to the removal of $H_2S$ by absorption-oxidation, and to the production of sulfur from gas mixtures containing $H_2S$ via a process using a dimethyl formamide solvent to which small amounts of amine have been added. Accordingly, the invention is not to be construed as limited to the specific embodiments or examples discussed but only as defined in the appended claims or substantial equivalents of the claims.

What is claimed is:

1. A process for removing $H_2S$ from a gas mixture containing $H_2S$ and for the production of sulfur which process comprises contacting the gas mixture with a solution, prepared by mixing 100 parts of an $H_2S$ solvent selected from dimethyl formamide, monomethyl formamide, N-methyl-pyrrolidone, hexamethylphosphoratriamide and sulfolane, with 0.05 to 5.0 parts of an amine, to absorb $H_2S$ from the gas mixture, and oxidizing $H_2S$ absorbed in the solution to sulfur by contacting the solution containing $H_2S$ with a gas comprising molecular oxygen.

2. A process in accordance with claim 1 wherein the $H_2S$ solvent comprises dimethyl formamide.

3. A process in accordance with claim 2 wherein the $H_2S$ contacting is carried out at a solution temperature between 30° and 140° F.

4. A process in accordance with claim 2 wherein the $H_2S$ contacting is carried out at a solution temperature between 30° and 110° F.

5. A process in accordance with claim 2 wherein the amine is dimethylamine.

6. A process in accordance with claim 2 wherein dimethyl formamide solution, which has been degraded in the course of absorbing said $H_2S$ from said gas mixture, is regenerated by heating at least a portion of the degraded dimethyl formamide solution in the presence of formic acid.

References Cited

UNITED STATES PATENTS

| | | | |
|---|---|---|---|
| 3,161,461 | 12/1964 | Deal et al. | 23—225 R X |
| 3,516,793 | 6/1970 | Renault | 23—225 R |
| 3,103,411 | 9/1963 | Fuchs | 23—226 X |
| 3,463,603 | 8/1969 | Freitas et al. | 55—73 X |

FOREIGN PATENTS

| | | | |
|---|---|---|---|
| 1,091,995 | 4/1961 | Germany | 23—225 R |

GEORGE O. PETERS, Primary Examiner

U.S. Cl. X.R.

423—228